United States Patent [19]

Langewellpott

[11] Patent Number: 5,063,573
[45] Date of Patent: Nov. 5, 1991

[54] METHOD FOR THE EQUALIZATION OF DISPERSIVE, LINEAR OR APPROXIMATELY LINEAR CHANNELS FOR THE TRANSMISSION OF DIGITAL SIGNALS AND ARRANGEMENT FOR CARRYING OUT THE METHOD

[75] Inventor: Ulrich Langewellpott, Thalfingen, Fed. Rep. of Germany

[73] Assignee: Licentia Patent Verwaltungs-GmbH, Frankfurt, Fed. Rep. of Germany

[21] Appl. No.: 408,509

[22] PCT Filed: Nov. 4, 1988

[86] PCT No.: PCT/EP88/01002
§ 371 Date: Aug. 21, 1989
§ 102(e) Date: Aug. 21, 1989

[87] PCT Pub. No.: WO89/06073
PCT Pub. Date: Jun. 29, 1989

[30] Foreign Application Priority Data
Dec. 24, 1987 [DE] Fed. Rep. of Germany ....... 3744075

[51] Int. Cl.⁵ .................................... H03H 21/00
[52] U.S. Cl. .................................. 375/14; 375/96;
364/724.2; 364/724.11
[58] Field of Search ............ 375/12, 14, 96; 333/18;
364/724.2, 724.11, 724.19

[56] References Cited
U.S. PATENT DOCUMENTS

| | | | |
|---|---|---|---|
| 3,775,685 | 11/1973 | Eggimann et al. ................ | 375/11 |
| 3,936,749 | 2/1976 | Guillemin ........................ | 375/96 |
| 4,012,628 | 3/1977 | Gersho ............................. | 375/12 |
| 4,146,840 | 3/1979 | McRae et al. .................... | 375/12 |
| 4,328,585 | 5/1982 | Monsen ............................ | 375/14 |
| 4,404,600 | 9/1983 | Murakami ........................ | 333/18 |
| 4,483,009 | 11/1984 | Honda et al. .................... | 375/14 |
| 4,669,091 | 5/1987 | Nossen ............................. | 375/14 |
| 4,672,637 | 6/1987 | Halpern et al. .................. | 375/96 |
| 4,733,402 | 3/1988 | Monsen ............................ | 375/14 |
| 4,742,353 | 5/1988 | D'Addio et al. ................ | 364/724.19 |
| 4,791,390 | 12/1988 | Harris et al. .................... | 364/724.19 |
| 4,920,530 | 4/1990 | Wouda et al. .................... | 333/18 |

FOREIGN PATENT DOCUMENTS 3246525 6/1984 Fed. Rep. of Germany.
3403715 8/1985 Fed. Rep. of Germany.

OTHER PUBLICATIONS

Kohno, R.; Combination of Cancelling Intersymbol Interference and Decoding of Error-Correcting Code; IEE Proceedings, vol. 133, Jun. 1986, pp. 224–231.
Monsen, P.; Feedback Equalization for Fading Dispersive Channels, IEEE Transactions on Information Theory, Jan. 1971, pp. 56–64.
Godard, D.; Channel Equalization Using a Kalman Filter for Fast Data Transmission, May 1974, pp. 267–273.
Proakis, J. G.; An Adaptive Receiver for Digital Signaling Through Channels . . . IEEE Transactions on Informaiton Theory, Jul. 1969, pp. 484–497.
Forney, G. Jr.; The Viterbi Algorithm, Proceedings of the IEEE, vol. 61, No. 3, Mar. 1973, pp. 268–278.

Primary Examiner—Benedict V. Safourek
Assistant Examiner—Young Tse
Attorney, Agent, or Firm—Spencer & Frank

[57] ABSTRACT

A method for the equalization of dispersive, linear or approximately linear channels for the digital signal transmission by using an adaptive matched filter matched to the entire transmission channel, which converts the received signal into a time-discrete signal sequence and during this process determines the optimum sampling times by itself, and by the use of a subsequent equalizer which equalizes the signal sequence in sections by an iteration method with relaxation is disclosed.

20 Claims, 3 Drawing Sheets

METHOD FOR THE EQUALIZATION OF DISPERSIVE, LINEAR OR APPROXIMATELY LINEAR CHANNELS FOR THE TRANSMISSION OF DIGITAL SIGNALS AND ARRANGEMENT FOR CARRYING OUT THE METHOD

BACKGROUND OF THE INVENTION

1. Field of the Invention

The invention relates to a method for the equalization of dispersive, linear or approximately linear channels for the transmission of digital signals using a matched filter and a following equalizer and an arrangement for carrying out the method.

2. BACKGROUND INFORMATION

Methods and arrangements of this type are generally used in systems for the transmission of information via dispersive, time-variant channels, particularly radio channels as, for example, in digital audio broadcasting systems (DAB) or in cellular mobile radio systems with dispersive multi-path propagation. Their purpose consists in the receiver-side equalization for the suppression of intersymbol interference, with utilization of multi-path diversity in the abovementioned cellular mobile radio systems.

Known methods of this type, like, for example, the methods described in the articlss by P. Monsen "Feedback Equalization for Fading Dispersive Channels", IEEE Transactions on Information Theory, January 1971, pages 56–64, and D. Godard "Channel Equalization Using a Kalman Filter for Fast Data Transmission", IBM Journal Res. Develop., May 1974, pages 267–273, use decision-feedback equalizers (DFE) which are preceded by a matChed filter (MF) matched to the transmitter.

The main disadvantage of these methods consists in the fact that the adaptation of the receiver is too slow for many applications or can only be implemented with great expenditure.

Other methods, like, for example, the method described in the articles by J. G. Proakis and J. H. Miller "An Adaptive Receiver for Digital Signaling Through Channels With Intersymbol Interference", IEEE Transactions on Information Theory, Vol. IT-15, No. 4, July 1969, pages 484–497, use linear equalizers. The main disadvantage of these methods consists in their poor efficiency, particularly in the case of transmission via rapidly variable channels with high dispersion.

The Viterbi method (G. D. Forney jr. "The Viterbi Algorithm", Proceedings of the IEEE, Vol. 61, No. 4, March 1973, pages 268–278) is also known, in which however, although it is not restricted to linear or approximately linear channels as the abovementioned methods, the signal processing expenditure increases exponentially with increasing duration of dispersion as a result of which the economy of this method is generally greatly limited.

The invention has the object of creating a method of the type initially mentioned, which, with the least-possible signal processing expenditure, provides the possibility of maximum efficiency and fast adaptation of the receiver to the transmission channel, even with long dispersion.

SUMMARY OF THE INVENTION

The method according to the invention for the equalization of dispersive, linear or approximately linear channels for the transmission of digital signals by means of a matched filter and a following equalizer provides that the matched filter is matched to the entire transmission channel and subsequently the transmitted received signals r(t), which are characterized by a data sequence ak in the form of a sequence of symbols ai from the alphabet of the transmitter, are filtered in the matched filter. As a result of this filtering, a time-discrete signal sequence mfok ( matched filter output), is output at the output of the matched filter, in which arrangement the matched filter automatically determines the optimum sampling times for the time-discrete signal sequence mfok. Subsequently, this signal sequence $mfo_k$ is equalized completely or preferably in sections in the subsequent equalizer by means of an iteration method with relaxation and can subsequently be fed to one or several decision sections for hard and/or soft decisions for further signal processing, in which arrangement the decision sections with soft decision can be advantageously followed in each case by an error-correcting decoding circuit.

The advantages of the method consist mainly in the fact that a high efficiency and fast adaptation of the receiver to the transmission channel is achieved with a comparatively small signal processing expenditure even with long dispersion.

The method according to the invention is generally suitable for use in systems for information transmission via dispersive, time-variant channels, particularly radio channels. Apart from the use in digital audio broadcasting systems, the method according to the invention can be advantageously used mainly in cellular mobile radio systems with dispersive multi-path propagation, such as, for example, the future paneuropean mobile radio system.

An advantageous embodiment of an arrangement for carrying out the method consists of an adaptive matched filter, as it is known, for example, from DE 34 03 715A1, and a subsequent equalizer according to the invention (which is described in greater detail below).

Because of its high efficiency and fast adaptation, the equalizer system according to the invention (method and arrangement for carrying out the method) can process without difficulties, in particular, the minimum dispersion periods of 16 ps to be expected in the future paneuropean mobile radio system due to the multi-path propagation.

Its advantages become significant, particularly, in transmission with TDMA (Time Division Multiple Access) via rapidly variable channels with high dispersion. In this case, the features of fast adaptation and—particularly in compaison with the Viterbi method—small computing effort, count whereas the efficiency is approximately equal to the latter. Like all equalizer systems, the novel equalizer system is.strictly only applicable to linear transmission methods. The GMSK (Gaussian Minimum Shift Keying) modulation used in the paneuropean mobile radio system, however, can be considered as linear without noticeable degradation so that there is nothing in the way of using the equalizer system even there. In addition, the novel concept is also easily suitable for multi-stage linear modulation N-PSK (N-Phase-Shift-Keying), N-QAM (N Quadratur Amplitude Modulation). It is also possible to expand the application to continuous transmission.

The operation of the equalizer system will be described in three stages in the text which follows, the last stage at the same time offering the highest efficiency and also the best potential for simple implementation. The theory is based on the following relation:

$$D = \int |r(t) - x(t)|^2 dt \to \min \begin{cases} = \text{MLSE with Gaussian distribution} \\ = \text{MMSE generally} \end{cases} \quad (1)$$

As indicated, this relation corresponds to the principle of maximum likelihood sequence estimation (MLSE) with interference with Gaussian distribution and generally minimizes the minimum mean squared error (MMSE) with optimum selection of the reference x(t).

The following holds true for linear time-invariant channels:

$$r(t) = \Sigma_i p(t - iT) + n(t) \quad (2)$$

where $a_i$: symbols from the alphabet of the transmitter
p: channel impulse response (inc. filtering)
T: symbol period
n: interference Correspondingly, the reference can be described as follows:

$$x(t) = \Sigma_i \hat{p}(t - lT) \quad (3)$$

where $b_i$: required symbols; $b_i = a_i$ in the error-free case
$\hat{p}$: estimate of p

1st stage

The discrete possibly complex symbols $b_i$ are replaced by continuous quantities $\beta_i$.

$$\beta_i b_i + \delta b_i \quad (4)$$

$$x\beta = \Sigma \beta_i \hat{p}(t - iT) \quad (5)$$

$$D\beta = \int |r(t) - x\beta(t)|^2 dt \quad (6)$$

To minimize $D\beta$, the expression is differentiated with respect to the $\beta_k$ and set to zero. From this it follows that:

$$\Sigma \beta_i \int \hat{p}^*(t - iT)\hat{p}(t - kT) dt = \int r(t)\hat{p}^*(t - kT) dt \quad (7)$$

or $$\Sigma \beta_i R\hat{p}(k - i) = mfo_k \quad (8)$$

where $\hat{p}^*$: $\hat{p}$ complex conjugate
$R\hat{p}(m)$: autocorrelation function of the channel impulse response at time m.T
$mfo_k$: matched filter output This relation represents a linear system of equations for determining the $\beta_i$. Its significance becomes clear by applying the z transform:

$$B(z) = \Sigma \beta_i z^{-i} \quad (9)$$

$$\Phi(z) = \Sigma R\hat{p}(l) z^{-l} \quad (10)$$

$$MFO(z) = \Sigma mfo_k z^{-k} \quad (11)$$

$$B(z) \cdot \phi(z) = MFO(z) \quad (12)$$

or $$B(z) = MFO(z) \cdot \phi^{-1}(z)$$

This recalls the familiar "zero-forcing" equalizer, here with the input signal MFO(z) and the transfer function $\Phi^{-1}(z)$. The difference from the known representation consists, on the one hand, in the use of the matched filter matched to the instantaneous channel (and not only to the filtering in transmitter and receiver), the coefficients of which must be determined by current measurement of the channel impulsereponse; in addition, on the other hand, the inverse $\Phi^{-1}(z)$ is only indirectly determined by resolving the lfnear system of equations.

An iteration method with relaxation is suitable for this purpose. With a very long sequence of symbols and a channel impulse reponse which varies slowly with time, a plitting into shorter mutually overlapping sections becomes feasible, in which arrangement each new section is based on the respectively current channel impulse response. The following reformulation is suitably selected:

$$\Sigma \rho_j \beta_{k+j} = mfo'_k \quad (13)$$
$$\rho_j = R\hat{p}^*(j)/R\hat{p}(0)$$
$$mfo'_k = mfo_k/R\hat{p}(0).$$

Thus, according to the Gauss-Seidel iteration method used here, the iteration rule in iteration step 1, symbol k is:

$$\delta\beta_k^{(l)} = mfo'_k - \sum_{j<0} \rho_j \beta_{k+j}^{(l)} - \sum_{j\geq 0} \rho_j \beta_{k+j}^{(l-1)} \quad (14)$$

$$\beta_k^{(l)} = \beta_k^{(l-1)} + \alpha\delta\beta_k^{(l)} \quad (15)$$

where $\beta$:relaxation factor for controlling the convergence:

$\beta > 1$: overrelaxation
$\beta < 1$: underrelaxation
$\beta = 1$: no relaxation Observation of the convergence:

$$s^{(l)} = \Sigma |\delta\beta_k^{(l)}|^2 \quad (16)$$

reduction of $\beta$, if $s^{(l)} > s^{(l-1)}$ \quad (17)

Starting conditions:

$$\beta_k^{(0)} = mfo'_k \quad (18)$$

$$s^{(O)} = \Sigma |\beta_k^{(O)}|^2 \quad (19)$$

Termination condition:

$$s^{(lm)}23 \, \Sigma \cdot s^{(O)} \quad (20)$$

Decision, unless a soft decision is required:
Imaging $\beta_k^{(lm)}$ to the nearest element of the alphabet:

$$b_k = \beta_k^{(lm)} \quad (21)$$

This method allows a comparatively simple implementation in which in each iteration step one equalization filter runs with a fed-back output the configuration of which resembles a FIR filter (Finite Impulse Response filter).

Similar to the case of the "zero-forcing" equalizer, an increase in the noise and poor or no convergence can occur in this stage if $\Phi(z)$ cannot be inverted. Stage 2 described in the text following offers a first improvement.

2nd stage

In this case, the decision is already made during the iteration:

$$\delta\beta_k^{(l)} = mfo'_k - \sum_{j<0} p_j \beta_{k+j}^{(l)} - \sum_{j>0} p_j \beta_{k+j}^{(l-1)} - \beta_k^{(l-1)} \quad (22)$$

$$\beta_k^{(l)} = \beta_k^{(l-1)} + \alpha\delta\beta_k^{(l)} \quad (23)$$

There are no other deviations from stage 1.
The output is: $\beta_k^{(lm)}$ in the case of hard decision $\beta_k^{(lm)}$ in the case of soft decision.

The performance features of stage 2 now resemble those of the nonlinear feedback equalizer (DFE, Decision Feedback Equalizer). Apart from good convergence, efficient noise suppression is obtained if the interference is not too strong. However, there is a trend to lock into error patterns; under certain circumstances, limit cycles occur as in the case of amplitude- and time-discrete control loops. Stage 3 brings noticeable improvement.

3rd stage

A hard decision occurs either basically always (FIG. 4) or preferably during the iterations only when a value $\beta_k(l)$ is within a particular decision range around the discrete alphabet elements. The examples shown in FIGS. 5 and 6 illustrate alternatives for a binary alphabet.

Using stage 3, both very good convergence and good equalization are achieved. Especially for the GSM (Groupe Speciale Mobile) system, the following statements can be made in this connection:

The demodulation is followed by a preferably error-correcting convolution decoding. This requires soft decision of the demodulator for optimum effectiveness. In this case, generally no more than three iterations are needed to achieve a quality which almost equals that of the Viterbi algorithm for demodulation. By using alternative 2 (FIG. 6), the FIR (Finite Impulse Response) filtering can be reduced to addition/subtraction. To meet the requirement of equalization of channels up to a dispersion of 16 ps, less than a quarter of the signal processing expenditure of a corresponding Viterbi-type demodulator in Ungerböck's formulation is required with the novel equalizer concept.

In comparison with the DFE, it must be noted that the adaptation phase of the DFE can be compared with the iterations for solving the system of equations in the novel equalizer. Whilst the DFE generally consists of complex-value FIR filters, complex coefficients only occur in the matched filter preceding the actual equalization in the novel equalizer. As an essential advantage of the novel equalizer compared with the DFE, however, the elimination of sensitivity with respect to the choice of sampling time can be mentioned. This is achieved by the advanced adaptive matched filter which is based on the current channel measurement and is known per se, which is matched to the entire transmission channel.

BRIEF DESCRIPTION OF THE DRAWINGS

In the text which follows, the invention will be explained in greater detail with the aid of the figures, in which.

DETAILED DESCRIPTION OF THE PREFERRED EMBODIMENTS

Figure 1:
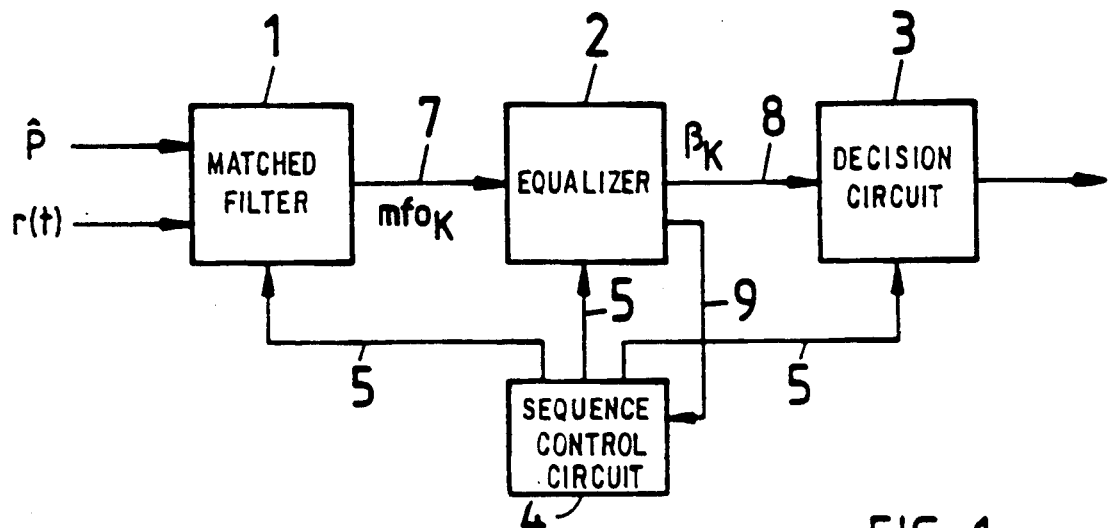
FIG. 1 shows the block diagram of an advantageous embodiment of an arrangement according to the invention for carrying out the method according to the invention.

The arrangement according to the invention for carrying out the method according to the invention in FIG. 1 consists of an adaptive matched filter 1 at the input of which are present, on the one hand, the received signals r(t) to be equalized and, on the other hand, the estimate p of the channel impulse reponse p, which is obtained by a different circuit (not shown). The output of the adaptive matched filter 1 is connected via a connecting line 7 to the input of an equalizer 2 and supplies the time-discrete signal sequence mfo$_k$ obtained from the filtering. In the equalizer 2, this signal sequence is equalized completely or in sections by means of an iteration method with relaxation. The estimated values $\beta_k$ obtained by the iteration process are output at the output of the equalizer 2 and can be further processed in a further circuit 3 connected via a connecting line 8 to the output of the equalizer 2. The equalization process is monitored by a sequence control circuit 4 with control lines 5. In this context, the sequence control circuit 4 receives from the equalizer 2 via a line 9 the information on when the individual iteration processes must be terminated in the equalizer 2.

Figure 2:
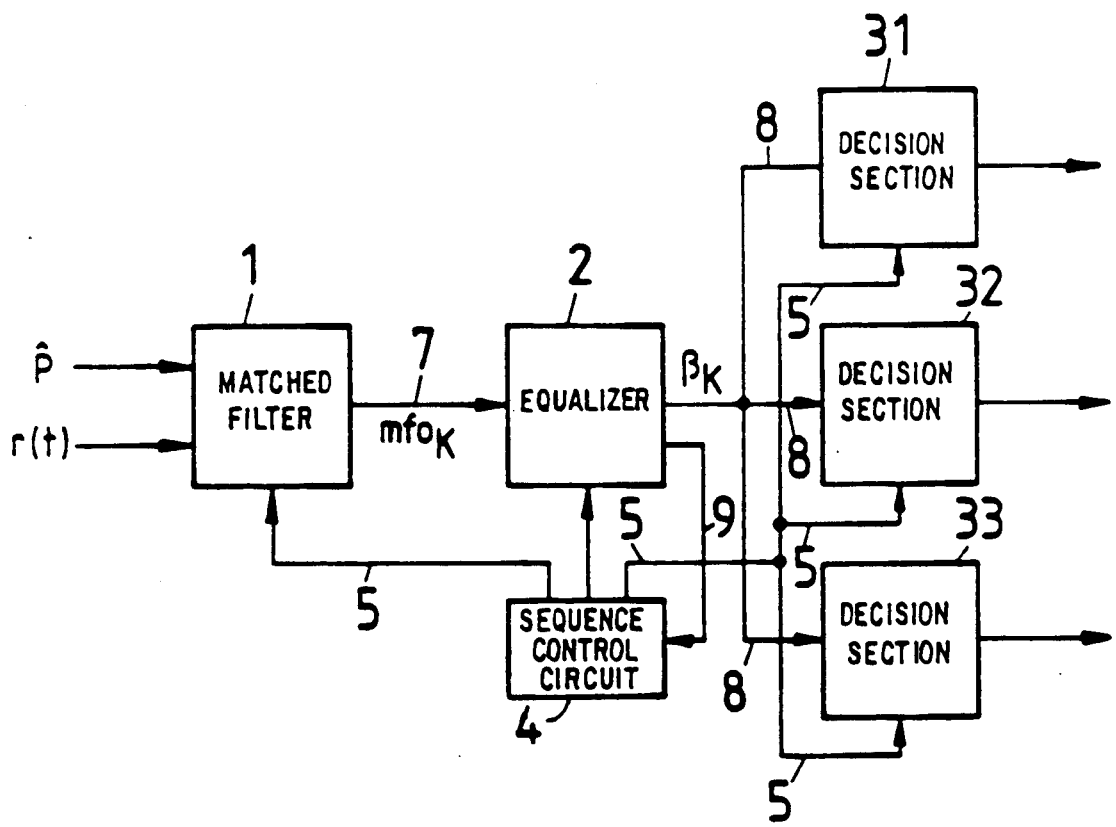
FIG. 2 shows the block diagram of a further advantageous embodiment of an arrangement according to the invention for carrying out the method according to the invention.
Figure 4:
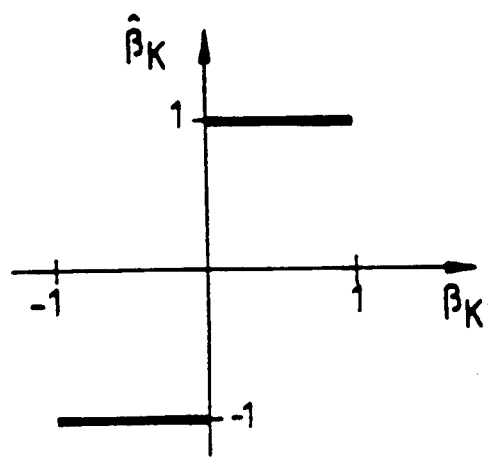
FIG. 4 shows a pictorial representation of the output signals of a decision section for hard decisions in dependence on the input signals for a binary alphabet.
Figure 5:
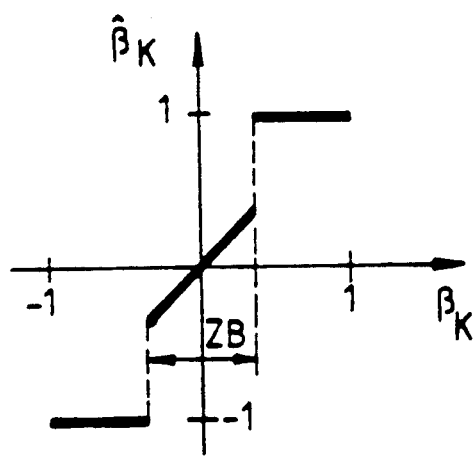
FIGS. 5–6 show pictorial representations of the output signals of various decision sections for soft decisions in dependence on the input signals for a binary alphabet.
Figure 6:
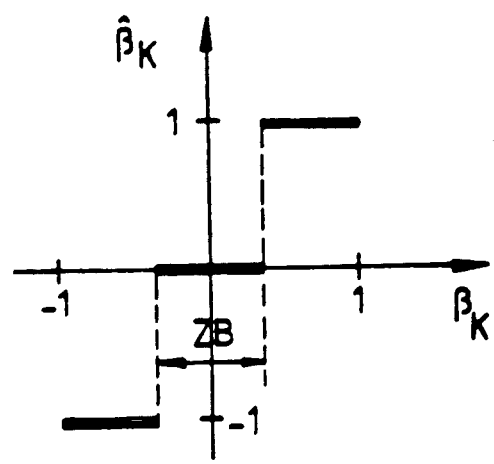

In this connection, the circuit 3 can be, for example, a decision section 31 for hard decisions or a decision section 32 or 33 for soft decisions or, as shown in FIG. 2, a combination of such decision sections, the decision sections 31, 32 and 33 differing in the type of their decision as is shown by way of example, in FIG. 4 (hard decision: unambiguous imaging of the input value $\beta_k$ to the nearest element bk of the alphabet for all $\beta_k$), FIG. 5 (soft decision I: no imaging of the input value $\beta_k$ to the nearest element b$_k$ of the alphabet for input values $\beta_k$ within an intermediate range ZB, unambiguous iaaging—hard decision—in the remaining ranges) and FIG. 6 (soft decision II: allocation of the mean value of two adjacent elements b$_k$ of the alphabet for input values $\beta_k$ within an intermediate range ZB, unambiguous imaging—hard decision—in the remaining ranges) for a binary alphabet. A decision section 32 or 33 for soft decisions can also be advantageously followed by an error-correcting decoding circuit.

Figure 3:
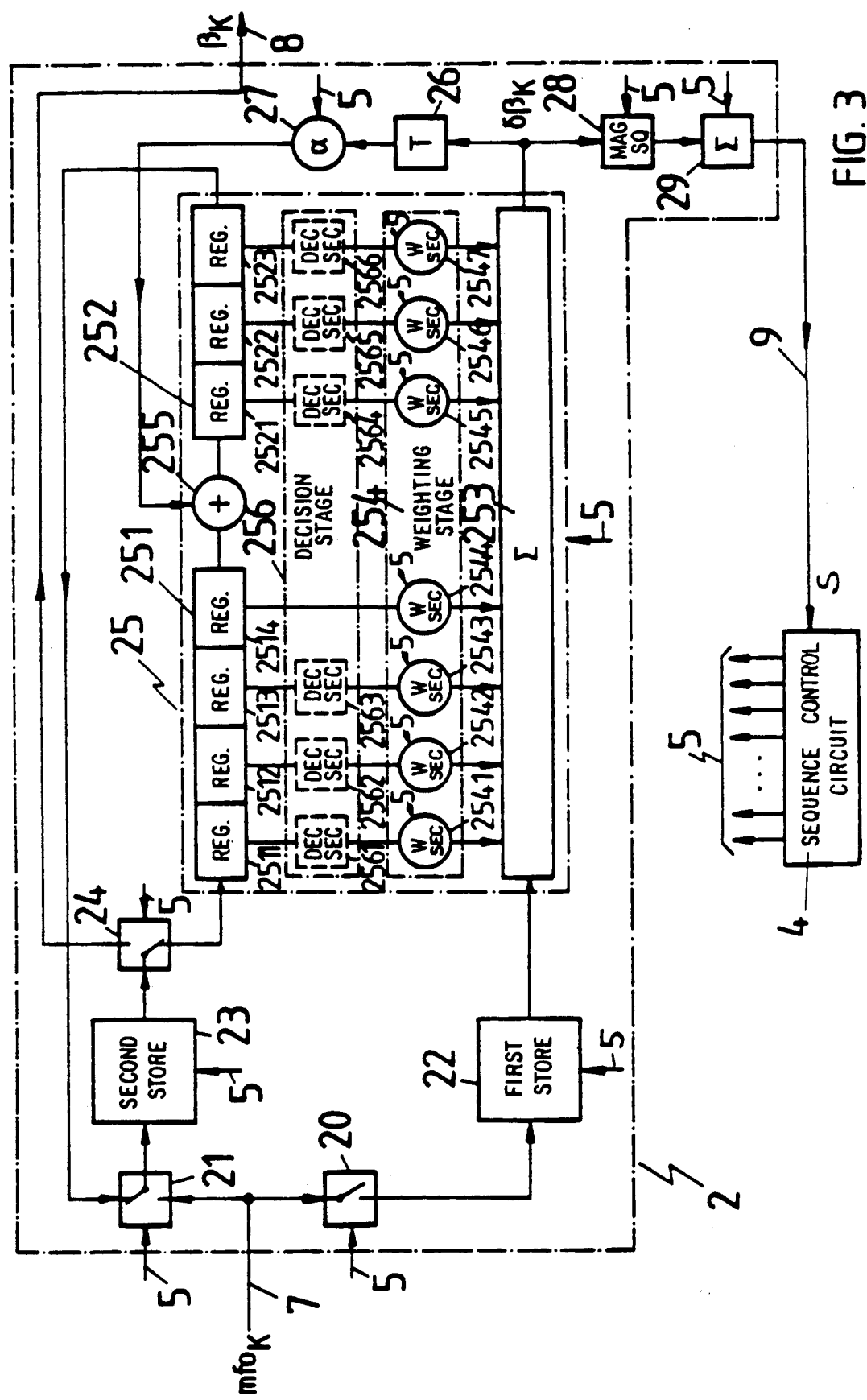
FIG. 3 shows the block diagram of an advantageous embodiment of the equalizer of the arrangement according to the invention for carrying out the method according to the invention.

The advantageous embodiment of the equalizer 2 of the arrangement according to the invention for carrying out the method according to the invention in FIG. 3 contains a first store 22 and a second store 23.

The input of the first store 22 is connected via an on/off-switch 20 and the connecting line 7 to the output of the adaptive matched filter (not shown) and at the output to the input of a summation section 253.

The second store 23 is connected at the input via a first change-over switch 21 either via the connecting line 7 to the output of the adaptive adapted filter (not shown) or to the output of a second shift register 252 which is connected in series with a first shift register 251 and an addition section 255. At the output, this second store 23 is connected via a second change-over switch 24 either to the input of the first shift register 251 or to the output 8 of the equalizer 2.

The individual register locations 2511-2514 and 2521-2524 of the first and second register 251, 252, respectively, are connected at the output either directly (for the 1st stage) or, with exception of the register location 2514 at the output of the first shift register 251, via decision sections 2561-2566 of a decision stage 256 (for the 2nd or 3rd stage) to individual controllable weighting sections 2541-2547 of a weighting stage 254.

The weighting sections 2541-2547, in turn, are connected at the output to the summation circuit 253. The shift registers 251, 252, the addition section 255, the weighting stage 254, the summation section 253 and possibly the decision stage 256 in this arrangement together form an equalization filter 25 the configuration of which resembles a FIR filter.

The output of the summation section 253 is connected, on the one hand, via a time delay section 26 and a subsequent controllable weighting section 27 with an adjustable weighting factor $\beta$ to the addition section 255 of the equalization filter 25 and, on the other hand, via a first circuit for forming the magnitude square 28, a subsequent further summation circuit 29 via a connecting line 9 to the sequence control circuit 4, 5.

At the beginning of an iteration process, the two stores 22 and 23 are connected via the switches 20 and 21 to the output of the adaptive matched filter and a section (overlapping other sections) of the time-discrete signal sequence mfok (or the complete signal sequence if it is short enough) is read into the two stores 22 and 23. The output of the second store 23 in this arrangement is connected via the second change-over switch 24 to the input of the first shift register 251.

The switch 20 is subsequently opened, that is to say the input of the first store 22 is disconnected from the output of the adaptive matched filter, and the input of the second store 23 is connected via the first change-over switch 21 to the output of the second shift register 252.

In succession, the data stored in the stores 22 and 23 are now transferred under timing of the sequence control circuit 4, 5 into the;shift registers 251, 252 and into the summation section. In this process, the values located in the shift register locations 2511-2514; 2521-2524 are weighted (after passing the decision stage 256 in the 2nd or 3rd stage) in the weighting stage 254 and the weighted data are finally summed together in the summation section 253.

The data $\delta 62_k$ summed together are subsequently delayed in time via the time delay section 26 and the weighting section 27 or are in each case fed, weighted with the set relaxation factor $\alpha$, via the addition section 255 to the input of the second shift register 252.

At the same time, the magnitude squares, which are subsequently summed together in the further summation circuit 29, are formed from the summed-together data $\delta \beta_k$ in the first circuit 28. The summation signal s is fed via the connecting line 9 to the sequence control circuit 4, 5 and is used, on the one hand, for setting the relaxation factor $\beta$ and, on the other hand, for deriving a criterion for the termination of the iteration process running in each case.

In an advantageous embodiment, the iteration process is terminated when the summation signal s drops below a particular first value.

In a further advantageous embodiment, the relaxation factor $\alpha$ for the fed-back summed-together data $\delta \beta_k$ is not predetermined in the subsequent iteration cycle but in each case set in such a manner that it is increased (decreased) when the difference of the sum signals s of the two preceding iteration cycles drops below (exceeds) a particular second value, in which advantageously the magnitude of the second value is selected in dependence on the magnitude of the respective last summation signal s.

The new estimated values $\beta_k$ appearing at the output of the second shift register 252 are continuously read into the second store 23 during the iteration process and during this process overwrite the data hitherto stored (thus the stored data of the signal sequence mfo$_k$ after the first iteration cycle and the estimated values $\beta_k$ obtained in the preceding iteration cycle in each case in the subsequent iteration cycles).

At the end of the iteration process, the store contents of the second store 23, that is to say the estimated values $\beta_k$ last stored, are passed via the changeover switch 24 to the output 8 of the equalizer 2 and from there forwarded to the subsequent signal-processing circuits such as, for example, decision sections and/or error-correcting decoding circuits. Subsequently, the next signal sequence mfo$_k$ or the next section of the signal sequence mfo$_k$ is processed in the equalizer 2 in that the inputs of the two stores 22 and 23 are again connected via the switches 20, 21 to the output of the adaptive matched filter and the output of the second store 23 is again connected via the second change-over switch 24 to the input of the first shift register 251 and the then following iteration process is repeated as described above.

Naturally, the method according to the invention and the arrangement according to the invention for carrying out the method can be developed or further developed or adapted to the various applications with expert knowledge without this having to be explained in greater detail at this point.

Thus, for example, it is possible in the illustrative embodiment of the equalizer 2 according to FIG. 3, to use, instead of the two shift registers, provided with four or three register locations by way of example, in the equalization filter of the equalizer, longer (or shorter) shift registers (with a correspondingly larger—or smaller—number of weighting sections in the weighting stage and—in the case of the 2nd or 3rd stage—decision sections in the decision stage of the equalization filter).

It is also possible to process, instead of the real data sequence $a_k$, assumed by way of example in the illustrative embodiment of the equalizer 2 according to FIG. 3, complex-value data sequences $a_k$ in the equalizer 2, in which case in the equalizer the two stores and the shift registers, the addition section and the weighting sections in the equalization filter, must be of complex design.

Finally, it is conceivable to carry out the estimation p of the channel impulse response p in the adaptive matched filter itself so that only the received signal r(t) needs to be input into the adaptive matched fitter.

I claim:

1. A method for the equalization of dispersive, linear or approximately linear channels, particularly radio channels, for transmitting digital signals by means of an matched filter and a following equalizer, comprising the steps of:

provided a matched filter (1) which is matched to the entire transmission channel;

filtering, in the matched filter (1), a received signal r(t) characterized by a data sequence $a_k$ to produce a time-discrete signal sequence $mfo_k$ at the output of the matched filter (1), which automatically determines the optimum sampling times for the time-discrete signal sequence $mfo_k$; and equalizing the time-discrete signal sequence $mfo_k$ in sections in the equalizer (2) by means of an iteration procedure with relaxation, with said procedure comprising the steps of:

subdividing the signal sequence $mfo_k$ into shorter mutually overlapping sections and storing the sections individually in a first and second store (22, 23) of the equalizer (2);

equalizing the shorter mutually overlapping sections of signal sequence $mfo_k$ stored in each case in an equalization filter (25) of the equalizer (2);

feeding the data stored in the second store (23) to the input of a first shift register (251) which is connected in series with a second shift register (252);

feeding, in each clock interval of one iteration cycle, the data stored in the individual register locations (2511-2514; 2521-2523) of the first and second shift registers (251; 252) via weighting sections (2541-1547) of a weighting stage (254) to a summation section (253), where they are summed together;

feeding back the data $\delta\beta_k$ summed together at the output of the summation section (253) with a time delay and additional weighting (relaxation) to the input of the second shift register (252);

generating in the equalization filter (25), during each iteration cycle, new estimated values $\beta_k$ of the data sequence $a_k$ which are in each case output at the output of the second shift register (252) and are subsequently stored in the second store (23) and during this process overwrite the data hitherto stored;

summing together in each iteration cycle the square of the magnitude formed from the processed data $\delta\beta_k$ at the output of the summation section (253) and the individual magnitude squares and using the sum signal s to determine the relaxation factor $\alpha$ for the processed data $\delta\beta_k$ fed back and as criterion for the termination of the iteration process; and after termination of the iteration process, outputting the estimated values $\beta_k$, last stored in the second store (23), of the data sequence $a_k$ at the output (8) of the equalizer (2) and subsequently storing the next section of the output signal sequence $mfo_k$ of the matched filter (1) in the two stores (22, 23).

2. The method according to claim 1, wherein the weighting factors of the individual weighting sections (2541-2547) of the weighting stage (254) correspond to the real part of the auto-correlation function of the pulse response of the transmission function of the entire transmission channel for the respective section.

3. The method according to claim 2, further comprising: selecting the length of a section in such a manner that the channel impulse response can be considered approximately as stationary during the section.

4. The method according to claim 1, further comprising: terminating the iteration process when the sum signal s drops below a particular first value.

5. The method according to claim 1, further comprising: increasing or reducing respectively, the relaxation factor $\alpha$ for the processed data $\delta\beta_k$ fed back in the subsequent iteration cycle if the difference between the sum signals s of the two preceding iteration cycles drops below or exceeds a particular second value respectively.

6. The method according o claim 5, wherein the magnitude of the particular second value depends on the magnitude of the respective last sum signals.

7. The method according to claim 1, further comprising: feeding the estimated values $\beta_k$, read out of the second store (23) after termination of the iteration process, of the data sequence $a_k$ to a decision section (31).

8. The method according to claim 1, further comprising: feeding the estimated values $\beta_k$, read out of the secon dstore (23) after termination of the iteration process, of the data sequence $a_k$ to an error-correcting decoding circuit (32 or 33).

9. The method according to claim 8, further comprising: directly feeding the data stored in the last register location (2514) at the output of the first shift register (251) to the associated weighting section (2544) and feeding the data stored in the remaining registers (2511-2513; 2521-2523) of the first and second shift registers (251, 252) via the decision sections (2561-2566) of the additional decision stage (256) to the associated weighting sections (2541-2543; 2545-2547) of the weighting stage (254).

10. The method according to claim 1, further comprising: feeding the data stored in the individual register locations (2511-2514; 2521-2523) of the first and second shift registers (251, 252) via decision sections of an additional decision stage (256) to the weighting sections (2541-2547) of the weighting stage (254).

11. The method according to claim 10 further comprising: in the decision sections of the decision stage (256) making a hard decision in each case.

12. The method according to claim 10 further comprising: in the decision sections of the decision stage (256), for the data of the register locations of the first and second shift registers (251, 252) which are located within a predetemrined range, in each case making a soft decision and otherwise making a hard decision.

13. The method according to claim 10 further comprising: in the decision sections of the decision stage (256), for data of the register locations of the first and second shift registers (251, 252) which are within a predetermined range, allocating the mean value of the hard decision values which are in each case adjacent and otherwise making a hard decision.

14. The method according to claim 1, used for a cellular mobile radio system with dispersive multi-path propagation.

15. The method according ot claim 1, used in a digital audio broadcasting system (DAB).

16. An arrangement for carrying out a method for the equaliation of dispersive, linear or approximately linear channels, particularly radio cahnnels, for transmitting digital signals by means of a matched filter and a following equalizer, wherein the matched filter (1) is an adaptive matched filter, and wherein the equalizer (2) comprises:

a first store (22) connected at its input via a controllable on-/off-switch (20) to an input (7) of the equalizer (2) and connected at its output to an input of a first summation section (253) of an equalizer filter (25); and a second store (23) connected at its input to a first controllable change-over switch (21) which selectively connects it either to th einput (7) of the equalizer (2) or to an output of a second shift register (252) of the equalization filter (25) and is connected at its output to a second controllable change-over switch (24) which connects it either to an input of a first shift register (251) of the equalization filter (25) or to an output (8) of the equalizer (2);

wherein, an output of the first summation seciton (253) of the equalization filter (25) is connected via a timing section (26) and a controllable weighting section (27) to a first addition section (255) which is connected between the first and second shift registers (251, 252) of the equalization filter (25) and the output of the first summation section (253) of the equalization filter (25) is further connected via a first circuit (28) for forming a magnitude square and a subsequent second summation section (29) to a sequence control circuit (4, 5).

17. The arrangement according to claim 16, wherein: each individual register location (2511-2514; 2521-2523) of the first and second shift registers (251, 252) of the equalization filter (25) is connected at its output respectively to an input of an associated weighting section (2541-2544; 2545-2547) of the weighting stage (254) of the equalization filter (25) and outputs of the weighting sections (2541-2547) are connected to the first summation section (253).

18. The arrangement according to claim 17, characterized in that the weighting sections (2541-2547) of the weighting stage (254) of the equalization filter (25) are controllable.

19. The arrangement according to claim 16 characterized in that eac of the register locations (2511-2514; 2521-2523) of the first and second shift registers (251, 252) of the equaliation filter (25) or each of the register locations apart from the last register location (2514) located at the output of the first shift register (251) is connected at the output in each case via a decision section (2561-2563; 254-2566) of an additional decision stage (256) to the input of the associated weighting section (2541-2543; 2545-2547) of the weighting stage (254).

20. The arrangement according to claim 16, characterized in that in the case of complex-value data sequences $a_k$, the adaptive matched-filter (1) and the stores (22, 23), the shift registers (251, 252), the addition section (256) of the equalization filter (25) and the weighting sections (2541-2547) of the weighting stage (254) of the equalization filter (25) are designed to be complex.

* * * * *